US011927038B2

(12) United States Patent
Wu

(10) Patent No.: US 11,927,038 B2
(45) Date of Patent: Mar. 12, 2024

(54) LOCKING DEVICE FOR WINDOW OR DOOR AND METHOD OF OPERATING THEREOF

(71) Applicant: SHANG TIAN ALUMINUM CO., LTD., Changhua County (TW)

(72) Inventor: Lu-Chien Wu, Changhua County (TW)

(73) Assignee: SHANG TIAN ALUMINUM CO., LTD., Changhua County (TW)

( * ) Notice: Subject to any disclaimer, the term of this patent is extended or adjusted under 35 U.S.C. 154(b) by 287 days.

(21) Appl. No.: 17/385,640

(22) Filed: Jul. 26, 2021

(65) Prior Publication Data

US 2022/0042357 A1 Feb. 10, 2022

(30) Foreign Application Priority Data

Aug. 5, 2020 (TW) ................................ 109126519

(51) Int. Cl.
*E05C 1/16* (2006.01)
*E05B 65/08* (2006.01)
*E05C 1/00* (2006.01)

(52) U.S. Cl.
CPC .......... *E05C 1/166* (2013.01); *E05B 65/0864* (2013.01); *E05C 1/002* (2013.01)

(58) Field of Classification Search
CPC ................. E05B 65/08; E05B 65/0864; E05C 2007/007; E05C 1/166; E05C 1/002; Y10S 292/46; Y20S 292/37
See application file for complete search history.

(56) References Cited

U.S. PATENT DOCUMENTS 632,140 A * 8/1899 Park .................... E05B 65/0864 70/DIG. 66
667,420 A * 2/1901 Blackburk ................ E05C 1/10 292/175

(Continued)

FOREIGN PATENT DOCUMENTS

CN 2680808 Y 2/2005
CN 1959049 A 5/2007

(Continued)

OTHER PUBLICATIONS

Search Report for TW109126519, dated Feb. 17, 2021, Total of 1 page.

(Continued)

*Primary Examiner* — Christine M Mills
*Assistant Examiner* — Faria F Ahmad
(74) *Attorney, Agent, or Firm* — Apex Juris, pllc; Lynette Wylie

(57) ABSTRACT

A locking device for a window or a door, wherein the window or the door has a sash slidable in a horizontal direction within a frame. When a user turns on a switch to control a block to move from the first position to the second position, the block protrudes out of a vertical surface of the sash, thereby driving a linkage member to disengage from the frame. At this time, the user could hold and push the block in the horizontal direction to move the sash between a third position and a fourth position. When the sash is pushed back to the third position, the block could be controlled to move back to the first position, namely back to a mounting groove, thereby moving the linkage member to a position where the linkage member is engaged with the frame. A method of operating thereof is provided as well.

8 Claims, 8 Drawing Sheets

(56) References Cited

U.S. PATENT DOCUMENTS

| | | | | | |
|---|---|---|---|---|---|
| 669,365 | A * | 3/1901 | Lutts | E05C 1/10 | 292/175 |
| 854,250 | A * | 5/1907 | Stephens | E05B 65/0864 | 16/DIG. 37 |
| 889,630 | A * | 6/1908 | Meikle | E05B 65/0864 | 292/153 |
| 5,390,516 | A * | 2/1995 | Alchin | E05B 65/0835 | 292/DIG. 60 |
| 5,511,833 | A * | 4/1996 | Tashman | E05B 65/08 | 70/95 |
| 6,709,031 | B1 * | 3/2004 | Michael | E05B 65/0864 | 292/DIG. 37 |

FOREIGN PATENT DOCUMENTS

| | | | |
|---|---|---|---|
| CN | 110424835 | A | 11/2019 |
| CN | 212614349 | U | 2/2021 |
| JP | S57123455 | U | 7/1982 |
| JP | H0616657 | U | 3/1994 |
| JP | 2006125179 | A | 5/2006 |
| JP | 2006200255 | A | 8/2006 |
| JP | 2016169515 | A | 9/2016 |
| JP | 2020084566 | A | 6/2020 |
| TW | 201525262 | A | 7/2015 |

OTHER PUBLICATIONS

Translation of Abstract of CN1959049, Total of 1 page.
Translation of Abstract of CN2680808, Total of 1 page.
Translation of Abstract of CN110424835, Total of 1 page.
Translation of Abstract of JP2006125179, Total of 1 page.
Translation of Abstract of JP2006200255, Total of 1 page.
Translation of Abstract of JP2020084566, Total of 1 page.
Translation of Abstract of TW201525262, Total of 1 page.
Office Action for JP2021117414, dated Jul. 4, 2022, Total of 4 pages.
Search Report for CN202010791043.1, dated Dec. 18, 2022. Total of 2 pages.
Translation of Abstract of CN212614349, Total of 1 page.
Translation of Abstract of JP2016169515, Total of 1 page.

* cited by examiner

LOCKING DEVICE FOR WINDOW OR DOOR AND METHOD OF OPERATING THEREOF

BACKGROUND OF THE INVENTION

Technical Field

The present invention relates generally to a horizontal sliding a window or a door, and more particularly to a locking device that could drive a sash of the window to slide along a frame and to an operating method of the locking device.

Description of Related Art

So far, the most common type of window is a casement window and a horizontal sliding window. The casement window usually includes a frame body and a sash that is pivotally connected to the frame body of the casement window. By pivotally rotating the sash of the casement window, the window could be opened or closed. Additionally, the horizontal sliding window includes a frame body and at least one sash that is slidable in a horizontal direction. By sliding the sash in the horizontal direction, the window could be opened or closed.

Generally, the sash of the casement window is disposed with a handle for holding by a user, so that the user could hold and exert force to the handle to pivotally rotate the sash relative to the frame body of the casement window, thereby controlling the window to open or to close. On contrary, the sash of the horizontal sliding window usually is not disposed with any handle, so that the user operates or pushes the sash of the horizontal sliding window to move horizontally within the frame body by holding rails of the sash or touching a glass pane of the sash. However, by said method of operating, the user is hard to exert a force to control the window, and the pane of the sash is easily stained by oily smears and fingerprints, making the window unsightly. Thus, the conventional horizontal sliding window has room for improvement.

BRIEF SUMMARY OF THE INVENTION

In view of the above, the primary objective of the present invention is to provide a locking device and a method of operating thereof, wherein the locking device is provided with a component that could be held by a user, so that the user could exert force onto the component to slide a sash of a horizontal sliding window within the frame.

The inventive subject matter provides a locking device disposed on a horizontal sliding window, wherein the horizontal sliding window includes a sash and a frame. The sash is slidably disposed in the frame. The sash has a vertical surface and a mounting groove that is recessed into the vertical surface. The locking device includes a locking structure disposed in the mounting groove. The locking structure includes a block, a linkage member, and a switch. The block is movable between a first position and a second position and has an outer surface. When the block is located in the mounting groove and the outer surface of the block is parallel to the vertical surface of the sash, the block is defined to be located at the first position. When a part of the block protrudes out of the vertical surface of the sash to allow the outer surface of the block is distant from the vertical surface of the sash, the block is defined to be located at the second position. The linkage member is connected to and is driven by the block. The switch is adapted to control the block to move from the first position to the second position. When the block is located at the first position, the linkage member is engaged with the frame to lock the sash to the frame. When the block is moved to the second position, the block drives the linkage member to disengage from the frame, so that the sash is movable within the frame. In this way, when the block is located in the first position, the sash is located to the frame by the engagement between the linkage member and the frame. When the block is controlled by the switch to move to the second position, the user could hold and exert a force to the block to move the sash within the frame.

The inventive subject matter further provides a method of operating the locking device, wherein the sash is slidable along a horizontal direction within the frame between a third position and a fourth position. The method includes the following steps.

Turn on the switch to control the block to move from the first position to the second position, so that the block is moved in a direction away from the mounting groove and protrudes out of the vertical surface of the sash, thereby driving the linkage member to disengage from the frame.

Hold and Push the block in the horizontal direction to slide the sash between the third position and the fourth position.

Hold and Push the block in the horizontal direction to slide the sash to the third position. Control the block to move from the second position to the first position and to return to the mounting groove. The movement of the block drives the linkage member to move to a position where the linkage member is engaged with the frame, thereby locking the sash to the frame.

When the block is controlled by the switch to move to the second position, the user could hold and push the block to move the sash to slide within the frame, thereby contributing to the convenience of controlling the sash and solving the operating problems caused by lacking the handle, such as the user is hard to exert force to move the sash and pane can be stained easily. When the block is located at the first position, the sash could be locked to the frame via the engagement between the linkage member and the frame, thereby enhancing the home safety and the burglar resistance. Furthermore, when the block is located at the first position, the outer surface of the block is parallel to and does not protrude out of the vertical surface of the sash, thereby avoiding the user to touch unintentionally.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
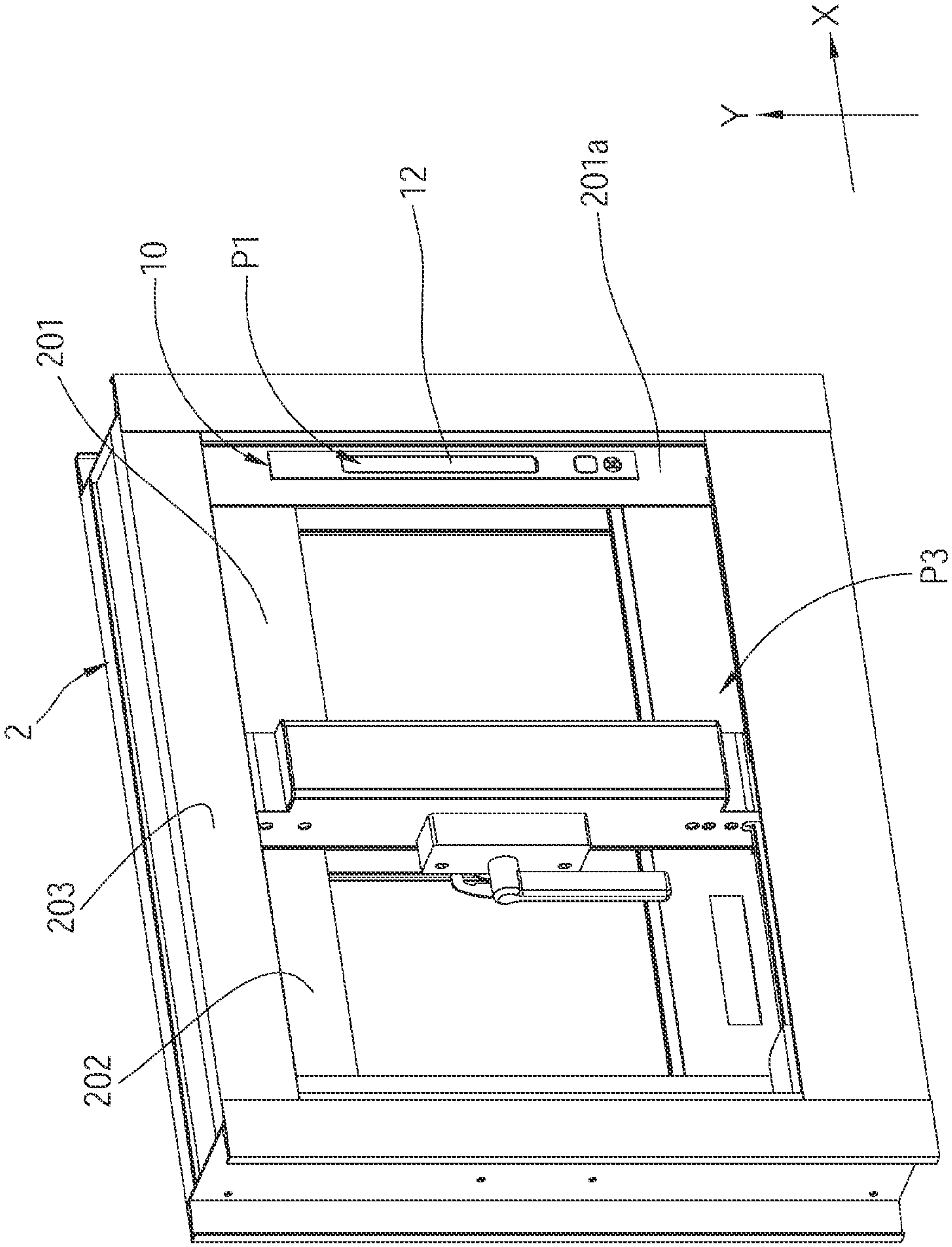
FIG. 1 is a perspective view of the horizontal sliding window that is disposed with the locking device of an embodiment according to the present invention, showing one of the two sashes is located in the third position.
Figure 2:
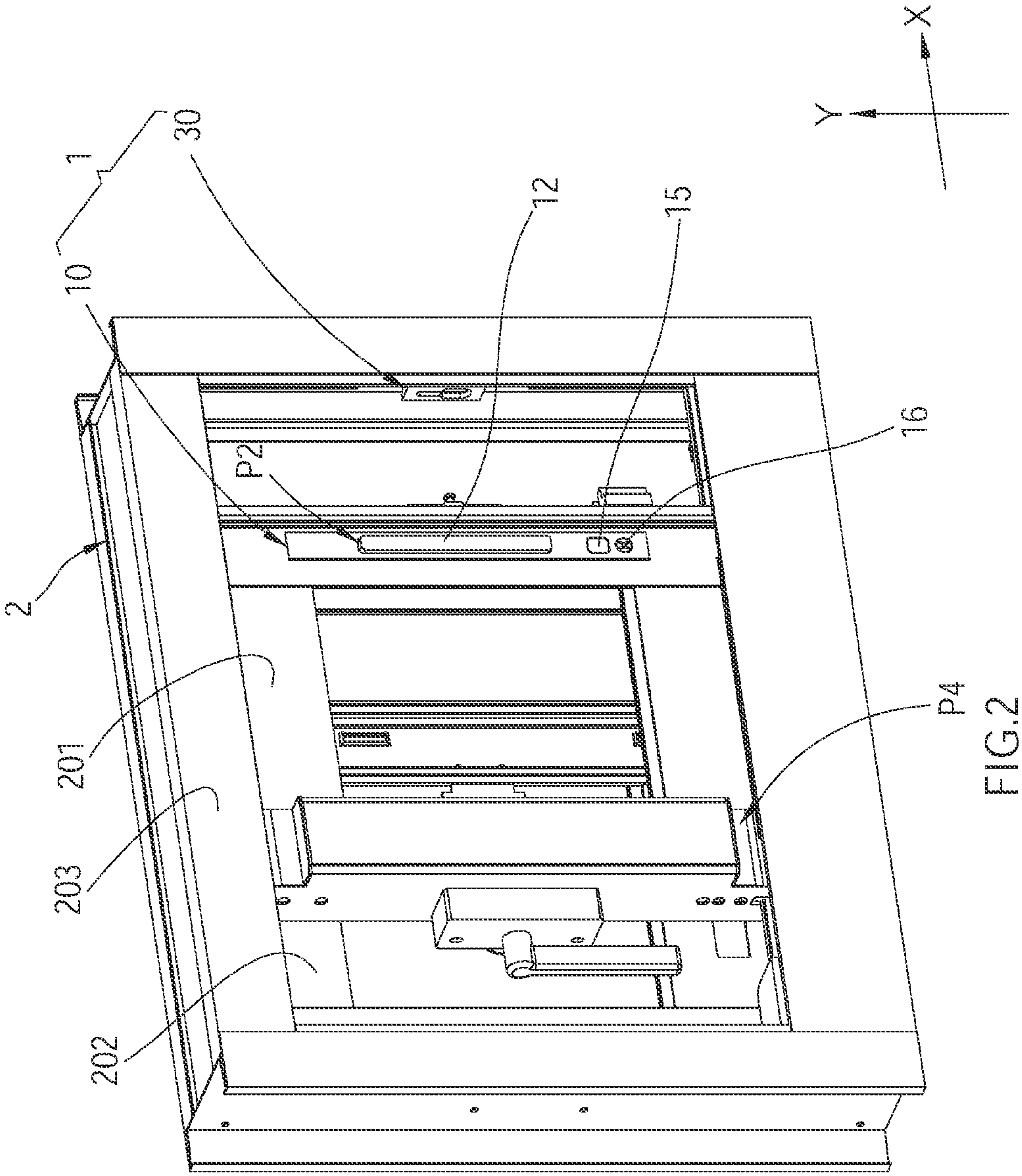
FIG. 2 is a perspective view of the horizontal sliding window, showing the block of the locking device of the embodiment according to the present invention is located at the second position, and one of the two sashes is located in the fourth position.

As illustrated in FIG. 1 to FIG. 7, a locking device 1 of an embodiment of the present invention for a door or a window is mounted on a horizontal sliding window 2. The horizontal sliding window 2 includes a first sash 201, a second sash 202, and a frame 203, wherein the first sash 201 and the second sash 202 are slidably mounted in the frame 203. As illustrated in FIG. 1 and FIG. 2, each of the two sashes 201, 202 could be slid along a horizontal direction X within the frame 203. In the current embodiment, the first sash 201 has a vertical surface 201*a* and a mounting groove 201*b* that is recessed into the vertical surface 201*a*. The locking device 1 includes a locking structure 10 and an engaged structure, wherein the locking structure 10 is disposed in the mounting groove 201*b* of the first sash 201. The engaged structure includes a lock keeper 30 and is disposed on the frame 203. In another embodiment, the locking structure 10 of the locking device 1 could alternatively be disposed to the second sash 202. In other embodiments, the locking device 1 could include two locking structures 10. Each of the two locking structures 10 is disposed on one of the two sashes 201, 202, and the frame 203 is disposed with two engaged structures corresponding to the locking structures 10 on the two sashes 201, 202. In other embodiments, said locking device 1 for a door or a window could also be disposed on a horizontal sliding door which is structurally similar to the horizontal sliding window 2.

Figure 3:
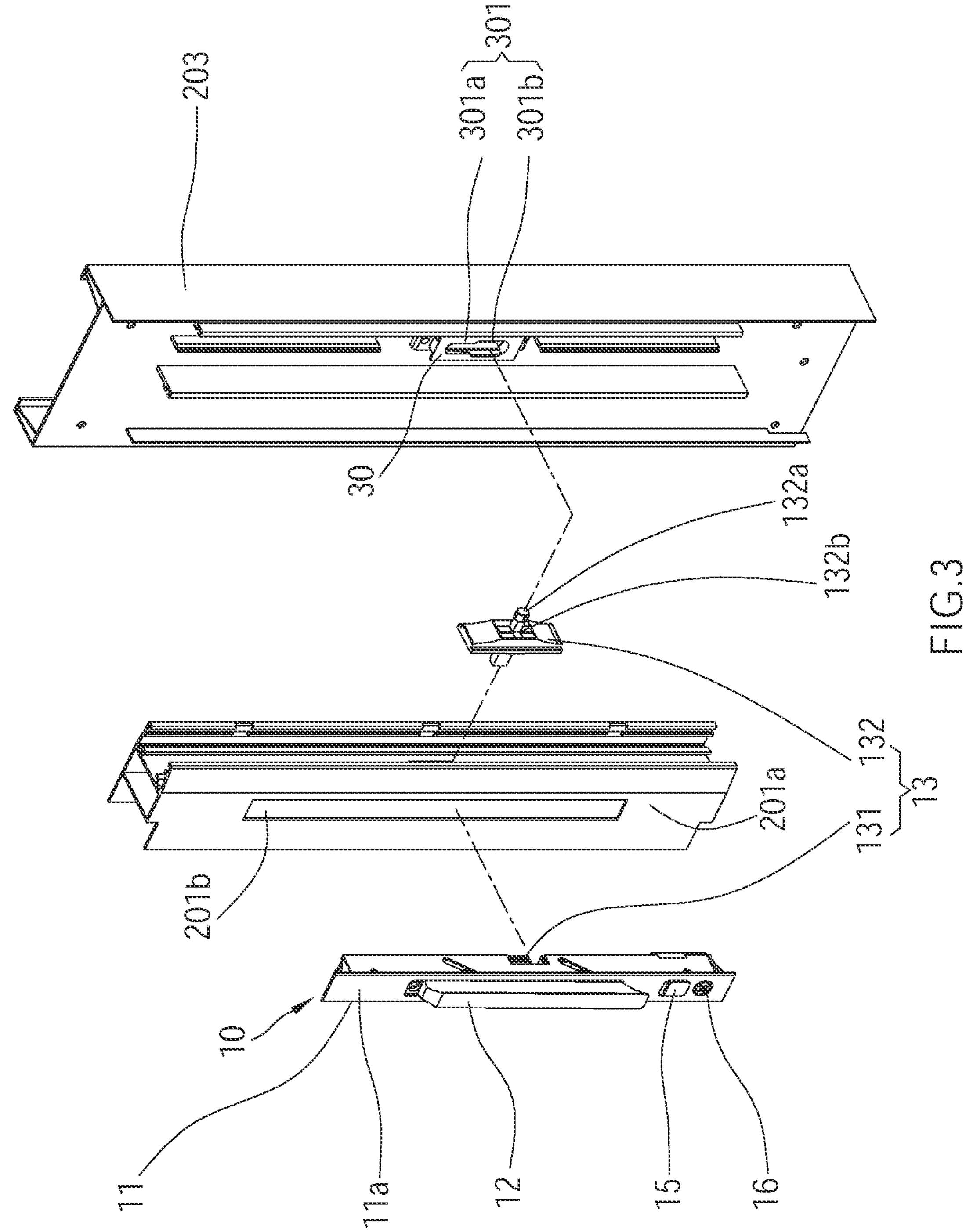
FIG. 3 is a partially exploded view of the locking device of the embodiment according to the present invention.
Figure 4:
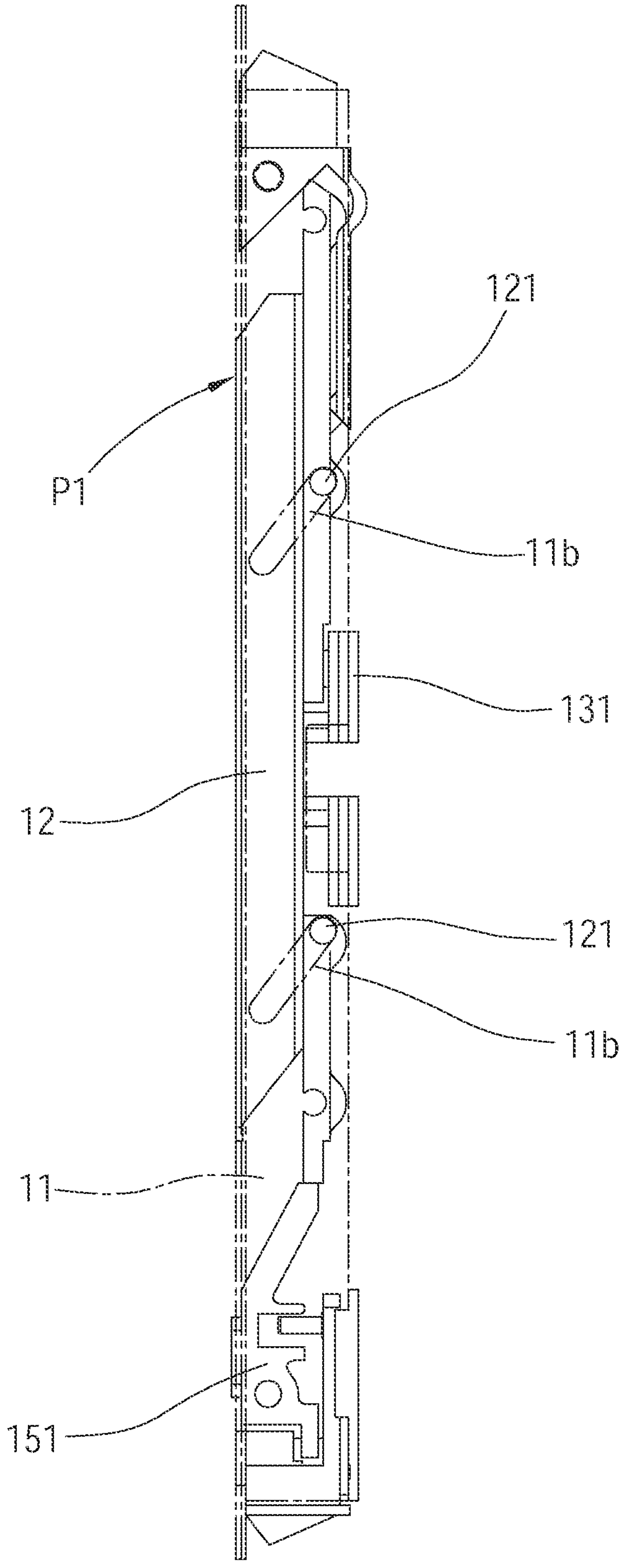
FIG. 4 is a schematic side view of the locking structure of the locking device of the embodiment according to the present invention, wherein the main body of the locking structure is depicted in transparent, showing the block of the locking device is located in the first position.
Figure 5:
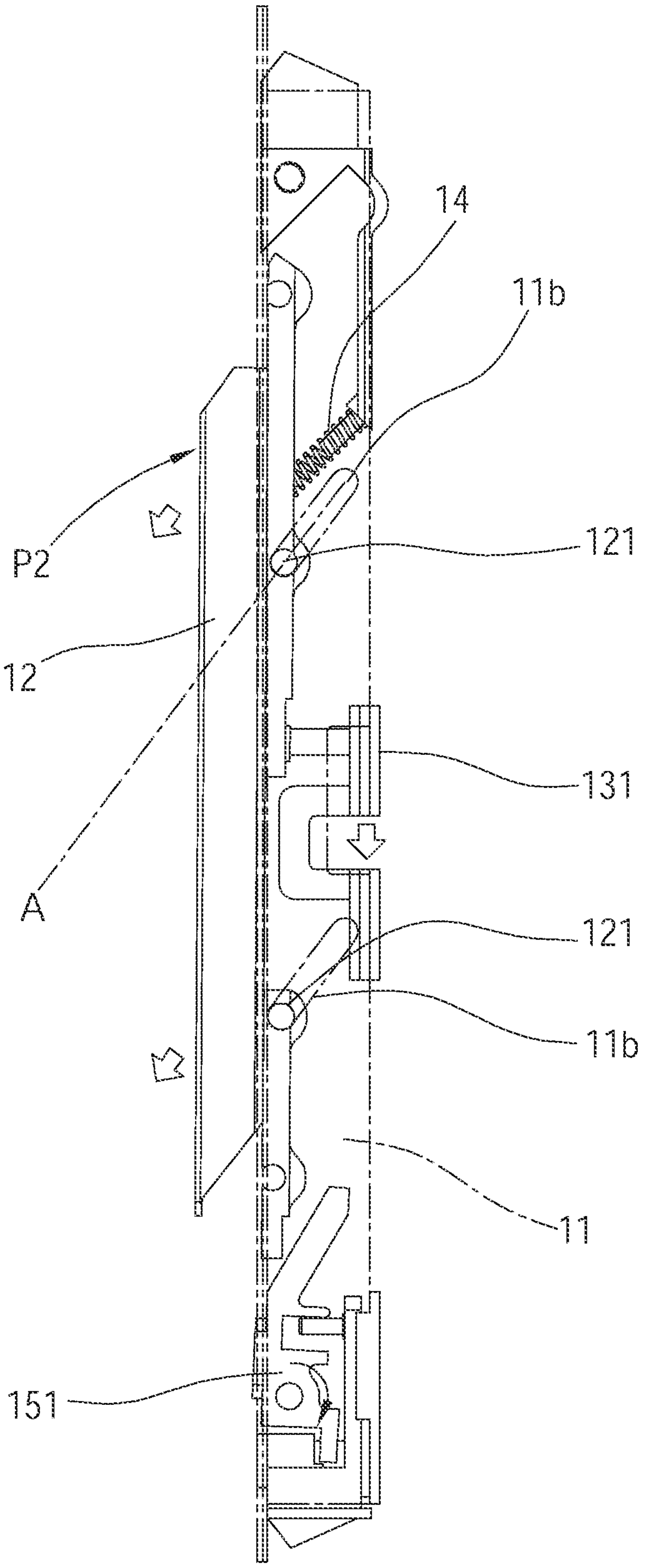
FIG. 5 is similar to FIG. 4, showing the block of the locking device is located in the second position.

As illustrated in FIG. 3 to FIG. 5, the locking structure 10 includes a main body 11, a block 12, a linkage member 13, an elastic member 14, and a switch 15. The main body 11 has a surface 11*a* and a recess that is recessed into the surface 11*a*. The block 12, the linkage member 13, and the elastic member 14 are disposed in the recess of the main body 11. The switch 15 is disposed to the main body 11 and includes a controlling member 151. The controlling member 151 is pivotally connected to the main body 11 and could be swung by operating. An end of the elastic member 14 urges against the block 12, another end of the elastic member 14 urges against the main body 11. When the block 12 is located at a first position P1, the block 12 is abutted by the controlling member 151 and presses the elastic member 14. When the controlling member 151 is controlled to swing away from a position where the controlling member 151 abuts the block 12, the elastic member 14 pushes the block 12 to move along an axial direction A, which is away from the mounting groove 201*b*, from the first position P1 to the second position P2. Simultaneously, the linkage member 13 is driven to move in a vertical direction Y by the movement of the block 12 (as shown in FIG. 5). In the current embodiment, the horizontal direction X, the vertical direction Y, and the axial direction A are not parallel to each other.

Figure 6:
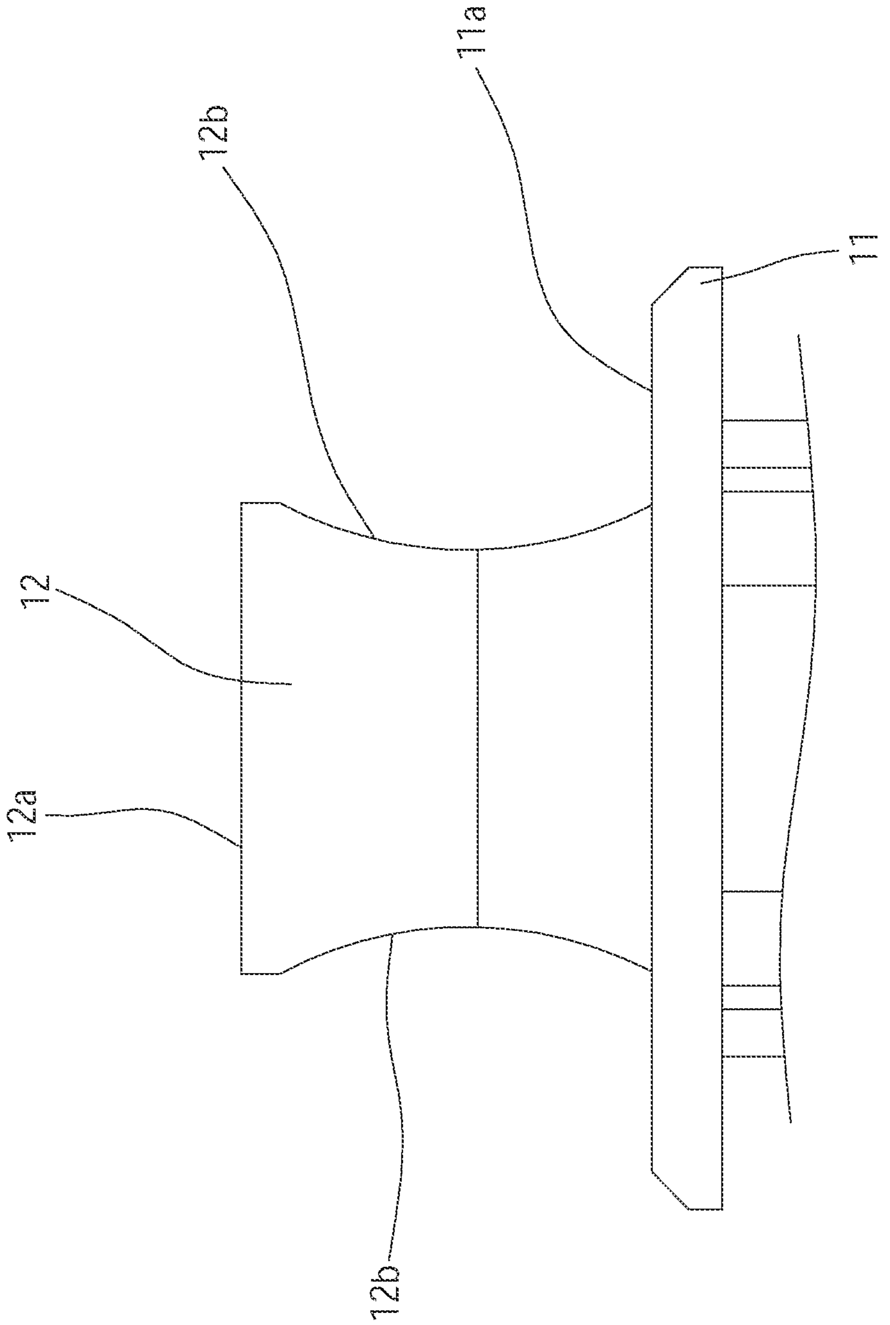
FIG. 6 is a schematic side view of the locking structure of the locking device of the embodiment according to the present invention seen from another perspective.

More specifically, when the block 12 is located at the first position P1, the block 12 is located in the recess and the mounting groove 201*b*. An outer surface 12*a* of the block 12 is parallel to the vertical surface 201*a* of the first sash 201 and is aligned with the surface 11*a* of the main body 11. When the block 12 is located at the second position P2, the block 12 protrudes out of the vertical surface 201*a* of the first sash 201 and the surface 11*a* of the main body 11. As illustrated in FIG. 6, the block 12 has two opposite sides in the horizontal direction X, wherein each of the two opposite sides in the horizontal direction X has a concave surface 12*b* for holding by a user, so that the user could hold and push the block 12 to slide the first sash 201 along the frame 203 when the block 12 is located at the second position P2. With such design, the user could easily control and operate the first sash 201 to open or to close by holding the block, so that an inconvenience caused by lacking handle and a problem of oily smears and stains on window pane could be solved. When the block 12 is located at the first position P1, the outer surface 12*a* of the block 12 is parallel to the vertical surface 201*a* of the first sash 201 and is aligned to the surface 11*a* of the main body 11, thereby avoiding the block 12 from being carelessly touched. In the current embodiment, when the locking structure 10 is disposed in the mounting groove 201*b* of the first sash 201, the surface 11*a* of the main body 11 is parallel to the vertical surface 201*a* of the first sash 201. Practically, the surface 11*a* of the main body 11 could be parallel and aligned with the vertical surface 201*a* of the first sash 201, which could also achieve efficacy of avoiding being carelessly touched by the user.

As illustrated in FIG. 1 and FIG. 2, the first sash 201 and the second sash 202 could be respectively slid along the horizontal direction X between a third position P3 and a fourth position P4. As illustrated in FIG. 3, the lock keeper 30 of the engaged structure has a slot 301, wherein the slot 301 has a first section 301*a* and a second section 301*b* along the vertical direction Y. The linkage member 13 includes a first component 131 and a second component 132. The first component 131 is disposed in the recess of the main body 11 and in the mounting groove 201*b*. The first component 131 is connected to the block 12. Through a perforation on a side wall of the mounting groove 201*b*, an end of the first component 131 is connected to the second component 132. The second component 132 of the linkage member 13 has a head 132*a* and a connecting portion 132*b*, wherein the head 132*a* extends along the horizontal direction X. The connecting portion 132*b* is connected to the head 132*a* and is connected to the block 12 via the first component 131. An external diameter of the head 132*a* is greater than a hole size of the first section 301*a* and is smaller than a hole size of the second section 301*b*. With such design, when the first sash 201 is located at the third position P3 and the block 12 is located at the first position P1, the second component 132 of the linkage member 13 is located in the first section 301*a* of the slot 301, allowing the head 132*a* abutting against a side of the lock keeper 30. Thus, the first sash 201 could be locked with the frame 203 by engaging the linkage member 13 and the lock keeper 30. When the block 12 is controlled by the switch 15 to move to the second position P2, the block 12 drives the second component 132 of the linkage member 13 to move along the vertical direction Y to the second section 301*b* of the slot 301, so that the second component 132 of the linkage member 13 leaves from a position where the second component 132 could be engaged with the lock keeper 30. At this time, the user could hold and push the block 12 to slide the first sash 201 within the frame 203.

In other words, by simply operating the switch 15, the user could control the block 12 to move from the first position P1 to the second position P2 in a direction away from the mounting groove 201*b*. Simultaneously, the second component 132 of the linkage member 13 could be driven to move from the first section 301*a* to the second section 301*b* of the slot 301. On contrary, in the current embodiment, when the first sash 201 is located at the third position P3, the user could press and move the block 12 from the second position P2 to the first position P1. At this time, the block 12 presses the elastic member 14 and is abutted by the controlling member 151 to keep the block 12 in the first position P1. Simultaneously, the block 12 drives the second component 132 of the linkage member 13 to move from the second section 301*b* to the first section 301*a* of the slot 301, so that the first sash 201 could be locked onto the frame 203 by engaging the linkage member 13 with the lock keeper 30, thereby improving the security and efficacy of anti-theft. In the current embodiment, the user controls the movement of the block 12 between the first position P1 and the second position P2 by operating the switch 15 or pressing the block 12. In other embodiments, the block 12 could be controlled by another way to move between the first position P1 and the second position P2. For example, the user could control the block 12 by touching the switch to electrically drive the block 12 to move between the first position P1 and the second position P2. In the current embodiment, the linkage member 13 is engaged with the lock keeper 30 disposed on the frame 203 to lock the first sash 201 to the frame 203. In other embodiments, the linkage member 13 could be engaged with the frame 203 by another way. For example, the frame 203 could be replaced with a frame having a slot that is similar to said slot 301 of the lock keeper 30, so that the linkage member 13 could directly be engaged with the frame through the slot of the frame without a need for the lock keeper.

The recess of the main body 11 has two opposite walls in the horizontal direction X, wherein each of the two walls of the recess has two positioning holes 11*b*, and the two positioning holes 11*b* extend along the axial direction A. Each of two sides of the block 12, which correspond to the walls of the recess, has two pins 121 that correspond to the two positioning holes 11*b*, and each of the two pins 121 is inserted through one of the two positioning holes 11*b*. In this way, a movement of the block 12 could be restricted (namely, guided) by the two positioning holes 11*b*, so that the block 12 could accurately move between the first position P1 and the second position P2. In fact, a number of the positioning holes 11*b* could be one or more than two, and a number of the pins 121 could also accordingly and correspondingly be one or more than two.

Figure 7:
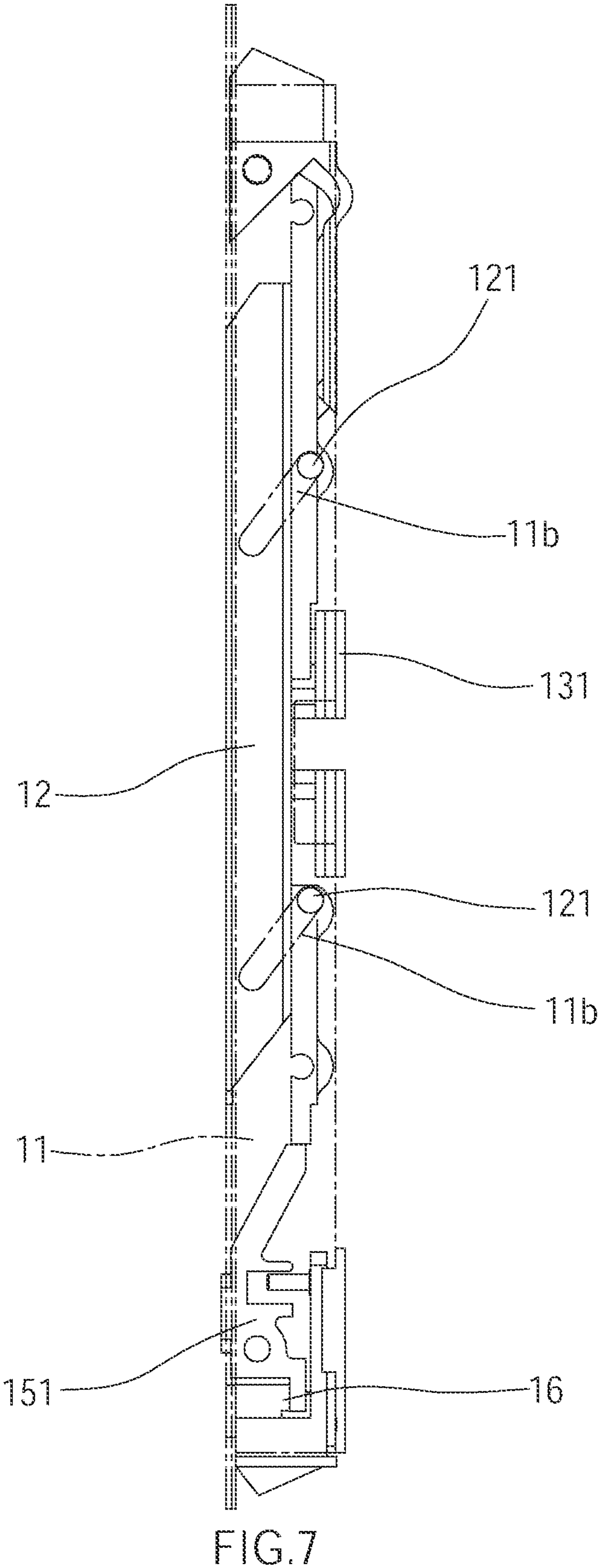
FIG. 7 is similar to FIG. 4, showing the locking member is interlocked with the controlling member.

Furthermore, the locking structure 10 includes a locking member 16, wherein the locking member 16 is disposed to the main body 11 and is adapted to restrict a rotation of the controlling member 151. As illustrated in FIG. 7, when the block 12 is located at the first position P1, the user could rotate the locking member 16 to make the locking member 16 be interlocked with the controlling member 151, so that the controlling member 151 could not be moved rotatably and is kept in a status of abutting against the block 12 when the user press the switch 15, thereby avoiding the switch 15 is carelessly touched to take a risk that the first sash 201 could be opened and improving the home safety.

Figure 8:
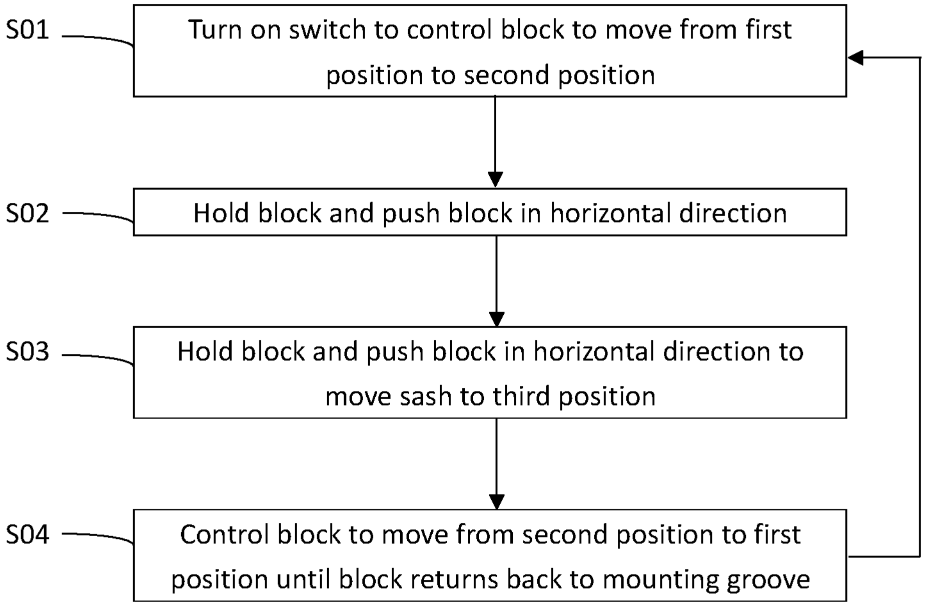
FIG. 8 is a flowchart of the method of operating the locking device according to the present invention.

As illustrated in FIG. 8, a method of operating the locking device of the embodiment according to the present invention includes the following steps:

Step S01: the switch 15 is turned on to control the block 12 to move from the first position P1 to the second position P2, so that the block 12 is moved in the direction away from the mounting groove 201*b* to protrude out of the vertical surface 201*a*, so that the linkage member 13 is driven to disengage from the lock keeper 30, thereby allowing the first sash 201 being movable between the third position P3 and the fourth position P4 within the frame 203.

Step S02: the block 12 is held and is pushed along the horizontal direction X to lead the first sash 201 to be moved between the third position P3 and the fourth position P4, so that the user could control a degree of open of the horizontal sliding window 2. In the horizontal direction X, each of the two opposite sides of the block 12 has a concave surface 12*b* for holding by the user, thereby facilitating the user to exert force.

Step S03: the block 12 is held and is pushed along the horizontal direction X to move the sash 201 to the third position P3.

Step S04: the block 12 is controlled to move from the second position P2 to the first position P1 and to make the outer surface 12*a* of the block 12 parallel to the vertical surface 201*a* of the first sash 201, so that the linkage member 13 is moved to a position where the linkage member 13 is engaged with the lock keeper 30 of the frame 203, thereby locking the first sash 201 to the frame 203. The step S04 further includes pressing the block 12 to move the block 12 from the second position P2 to the first position P1 to return back to the mounting groove 201*b*. In other embodiments, the block 12 could be moved between the second position P2 and the first position P1 in another way. For example, the switch 15 could be turned on to electrically drive the block 12 to move between the first position P1 and the second position P2. After the step S04, when the user needs to open the horizontal sliding window 2, the user could repeatedly conduct step S01 and step S02 to open the horizontal sliding window 2 or to adjust a degree of open of the horizontal sliding window 2.

To sum up, when the block 12 is controlled by the switch 15 to move to the second position P2, the user could hold and push the block 12 to slide the first sash 201 on the frame 203, so that the operating problem caused by lacking a handle and the problem that the window panes are easily smeared could be improved. Additionally, when the block 12 is located at the first position P1, the first sash 201 could be locked to the frame via the engagement between the linkage member 13 and the lock keeper 30, thereby enhancing the home safety and the burglar resistance. Moreover, when the block 12 is located at the first position P1, the outer surface 12*a* of the block 12 is parallel to the vertical surface 201*a* of the first sash 201 and is aligned with the surface 11*a* of the main body 11, thereby preventing the user from touching by accident.

It must be pointed out that the embodiment described above is only a preferred embodiment of the present invention. All equivalent structures and method which employ the concepts disclosed in this specification and the appended claims should fall within the scope of the present invention.

What is claimed is:

1. A locking device disposed on a horizontal sliding window, wherein the horizontal sliding window comprises a sash and a frame; the sash is slidably disposed in the frame;

the sash has a vertical surface and a mounting groove that is recessed into the vertical surface; the locking device comprises:

- a locking structure disposed in the mounting groove, wherein the locking structure comprises:
  - a block movable between a first position and a second position and having an outer surface, wherein when the block is located in the mounting groove and the outer surface of the block is parallel to the vertical surface of the sash, the block is defined to be located at the first position; when a part of the block protrudes out of the vertical surface of the sash to allow the outer surface of the block being distant from the vertical surface of the sash, the block is defined to be located at the second position;
  - a linkage member connected to and driven by the block;
- a switch adapted to control the block to move from the first position to the second position; when the block is located at the first position, the linkage member is engaged with the frame to lock the sash to the frame; when the block is located at the second position, the block drives the linkage member to disengage from the frame, thereby allowing the sash to be movable within the frame;
- an engaged structure that comprises a lock keeper disposed on the frame; when the block is located at the first position, the linkage member is engaged with the lock keeper to lock the sash to the frame; when the lock is located at the second position, the block drives the linkage member to be disengaged from the lock keeper, thereby allowing the sash to be movable within the frame;
- wherein the sash is slidable in a horizontal direction along the frame; the block is moved along an axial direction between the first position and the second position; when the block is moved in the axial direction, the linkage member is driven to move in a vertical direction; the horizontal direction, the vertical direction, and the axial direction are not parallel to each other;
- wherein the lock keeper has a slot; the linkage member is able to pass through the slot; in the vertical direction, the slot has a first section and a second section; the linkage member has a head and a connecting portion, wherein the head extends along the horizontal direction; the connecting portion connects the block and the head; an external diameter of the head is greater than a hole size of the first section and is smaller than a hole size of the second section, the hole size of the first section refers to the width of the first section, and the hole size of the second section refers to the width of the second section; when the block is located at the first position, the linkage member is located in the first section of the slot, allowing the head abutting against a side of the lock keeper; when the block is located at the second position, the linkage member is located in the second section of the slot.

2. The locking device as claimed in claim 1, wherein the locking structure comprises a main body having a surface and a recess, and the recess is recessed into the surface of the main body; the block and the linkage member are located in the recess; when the block is located at the first position, the block is located in the recess, and the outer surface of the block is aligned with the surface of the main body; when the block is located at the second position, the block protrudes out of the surface of the main body; the switch is disposed to the main body.

3. The locking device as claimed in claim 2, wherein the locking structure comprises an elastic member; an end of the elastic member urges against the block, and another end of the elastic member urges against the main body; the switch comprises a controlling member that is pivotally connected to the main body and is swingable by controlling; when the block is located at the first position, the block is abutted by the controlling member and presses the elastic member; when the controlling member is operated to swing to leave from a position where the controlling member abuts against the block, the elastic member pushes the block to move to the second position.

4. The locking device as claimed in claim 3, wherein the locking structure comprises a locking member; the locking member is disposed in the main body and is adapted to restrict movement of the controlling member.

5. The locking device as claimed in claim 2, wherein a wall of the recess of the main body has at least one positioning hole, and the at least one positioning hole extends along the axial direction; the block has at least one pin that corresponds to the at least one positioning hole of the recess, the at least one pin is inserted through the at least one positioning hole.

6. The locking device as claimed in claim 1, wherein the sash is slidable along a horizontal direction within the frame; the block has two opposite sides in the horizontal direction, and each of the two opposite sides of the block has a concave surface for holding by a user.

7. A method of operating the locking device as claimed in claim 1, wherein the sash is slidable along a horizontal direction within the frame between a third position and a fourth position; the method comprises:

- turning on the switch to control the block to move from the first position to the second position and to allow the block to move in a direction away from the mounting groove to protrude out of the vertical surface of the sash; simultaneously, the block drives the linkage member to disengage from the frame;
- holding and pushing the block in the horizontal direction to slide the sash between the third position and the fourth position;
- holding and pushing the block in the horizontal direction to slide the sash to the third position;
- controlling the block to move the block from the second position to the first position and to allow the block to return back to the mounting groove and to move the linkage member to a position where the linkage member is engaged with the frame, thereby locking the sash to the frame.

8. The method as claimed in claim 7, wherein when the sash is located at the third position and the block is located at the second position, the method further comprises pushing the block to move the block from the second position to the first position and to return the block back to the mounting groove, thereby driving the linkage member to move to the position where the linkage member is engaged with the frame to lock the sash to the frame.

* * * * *